June 5, 1923.
G. G. NAUGLE
1,457,993
LUBRICATING SYSTEM FOR AUTOMOBILES
Filed Jan. 30, 1922.
2 Sheets-Sheet 2
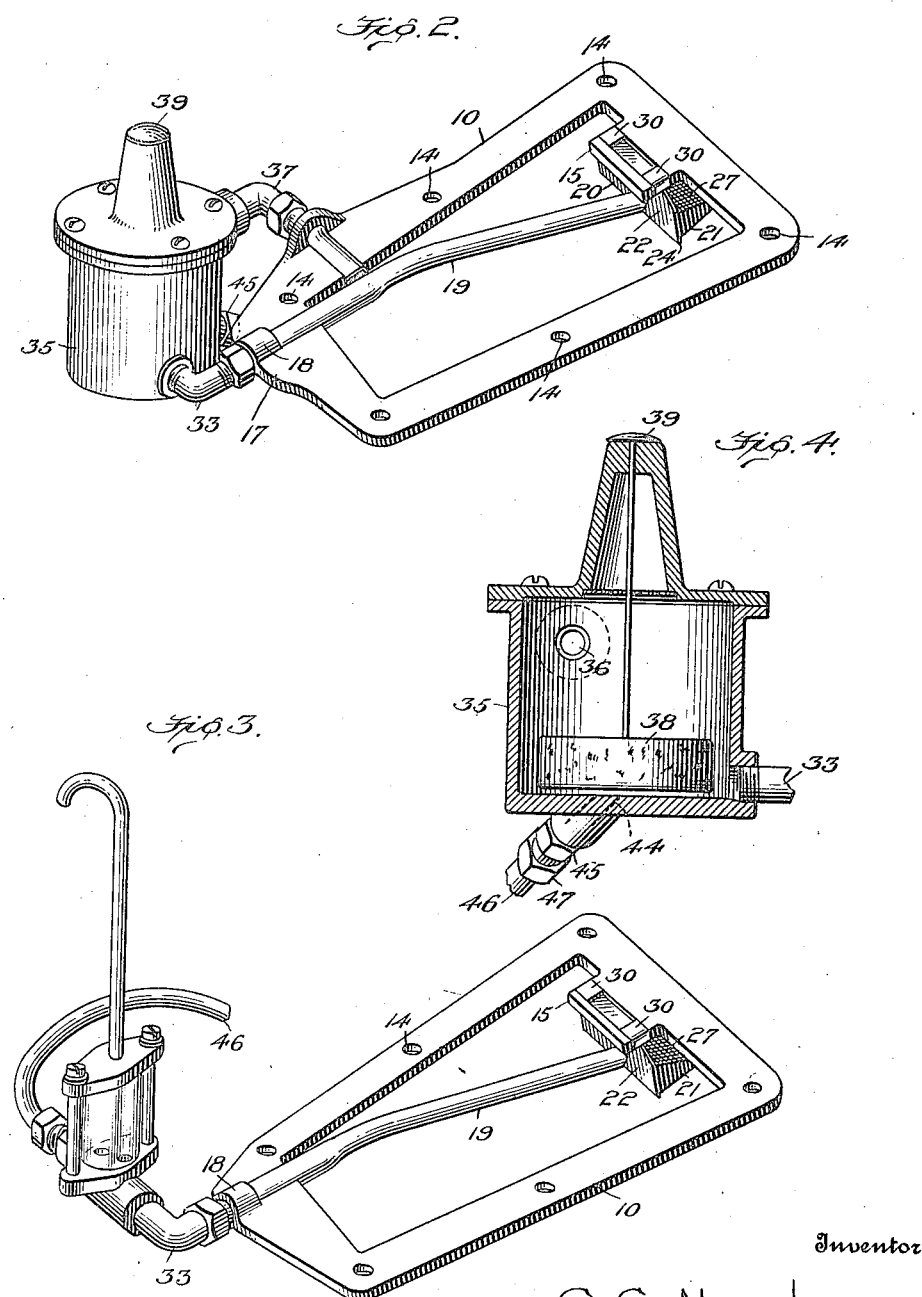
Inventor
G. G. Naugle
By Church & Church
His Attorneys Patented June 5, 1923.

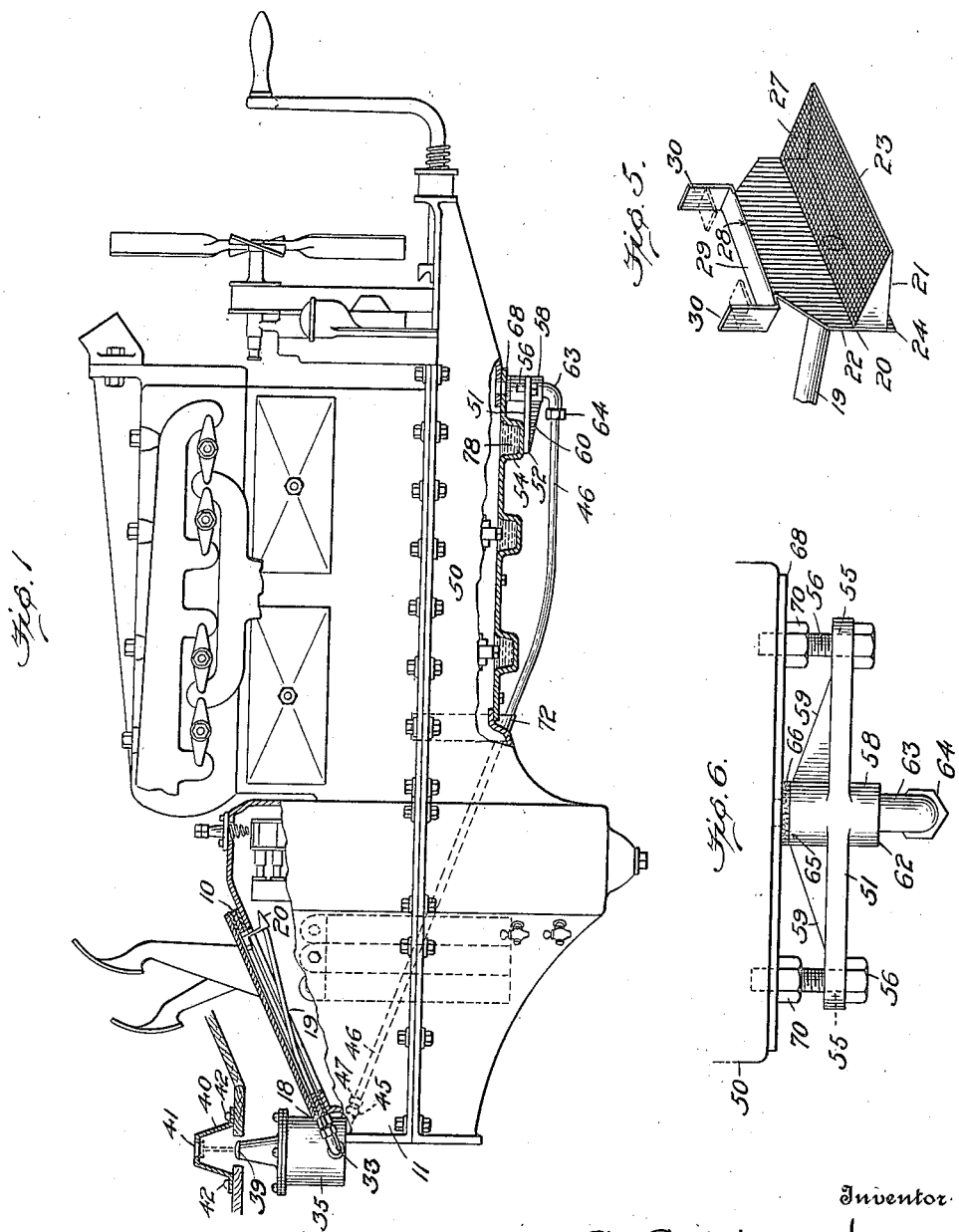

1,457,993

UNITED STATES PATENT OFFICE.

GIRARDUS G. NAUGLE, OF YORK, PENNSYLVANIA.

LUBRICATING SYSTEM FOR AUTOMOBILES.

Application filed January 30, 1922. Serial No. 532,818.

*To all whom it may concern:*

Be it known that I, GIRARDUS G. NAUGLE, a citizen of the United States, residing at York, in the county of York and State of Pennsylvania, have invented certain new and useful Improvements in Lubricating Systems for Automobiles; and I do hereby declare the following to be a full, clear, and exact description of the same, reference being had to the accompanying drawings, forming part of this specification.

This invention relates to lubricating systems for automobiles and has for its principal object the provision of a system whereby a portion of the oil thrown by the fly wheel of an automobile will be caught at a point just above the bands in the transmission case of an automobile and will be diverted to the front end of the crank case from whence it will run by gravity to the low point of the transmission case to repeat the cycle.

In certain automobiles, particularly the Ford, there is a small funnel adjacent the magneto which catches a portion of the splashed oil and delivers it to the front end of the crank case discharging it at a point near the large time gear. This system is perfectly satisfactory as long as the pipe connecting the funnel and discharge is free, but should this pipe become stopped up it is an exceedingly difficult matter to clear it as the entire pipe including both ends is inaccessible unless the entire machine be disassembled.

Several attempts have been made to remedy this disadvantage in the lubricating systems of small automobiles, but all have been unsuccessful so far, probably due to the fact that to install these improved systems it is necessary to alter certain of the parts of the standard equipment and this, as is well-known, is highly objectionable and necessarily prevents the wide adoption of the improved systems.

In the present system no part of the standard automobile is altered: everything is left exactly as it is except that parts are added which do not intefere in any way with the normal operation of the machine. Particular attention is called to the fact that with the present system it is not necessary to disassemble any part of the lubricating means in order to make any adjustment to the transmission bands, etc., as there is nothing to interfere in reaching such parts, although in all of the systems with which I am familiar some of the lubricating mechanism has to be removed in order to make the necessary adjustments. An open frame is provided for the top of the transmission case and the usual cover is fitted over this instead of over the hand hole in the transmission case.

A catch trough for the splashed oil is secured to the added open frame and discharges through a pipe which leads directly through the frame to a sight feed device which is located at the extreme back of the transmission case and therefore in proximity to the three operating pedals. From this sight feed connection a relatively small pipe leads alongside of the transmission case to a point at the extreme front of the drip pan of the crank case, the pipe leading through one of the bolt holes in the drip pan directly to the interior of the crank case, such pipe being held in place by a novel connection which in itself forms one of the objects of the present invention.

In the drawings,—

Figure 1 is a diagrammatic side view of my device as applied to a Ford motor.

Fig. 2 is a perspective of my open frame and sight feed.

Fig. 3 is a similar view of a modified open frame and sight feed.

Fig. 4 is a section through the reservoir or float chamber.

Fig. 5 is a perspective of the receiving trough.

Fig. 6 is a front elevation showing the means for attaching the connecting plate to the crank case.

The open frame 10 corresponds in contour to the margin of the usual hand hole in transmission case 11 of the motor and is provided with the usual bolt holes 14 and has at its upper end an inwardly extending lug 15 and at its lower end an extension 17 carrying a socket 18 to receive the pipe 19 leading from the receiving trough 20 which is supported from the lug 15.

The trough 20 has a sloping bottom 21 which meets the normally vertical back 22 at an acute angle so as to shed such oil as may drip over the receiving edge 23. If desired this feature may be accentuated by adding a slight lip such as 24, although in usual operation the acute angle between the bottom 21 and the back 22 will be sufficient to shed practically all of the oil and insure its falling upon the transmission bands, thus preventing their being burnt out as will occur in certain other lubricating systems where oil would tend to run down the receiving member of the rear end of the case thus skipping the transmission bands.

I preferably place a relatively fine wire gauze 27 over the top of the trough to prevent any bits of dirt or ravelings from entering the discharge pipe 19. In its preferred form the back 22 is bent rearwardly at a sharp angle as at 28 forming the portion 29 overlying the lug 15 and having wings 30 on either side of said lug, which wings are bent over and down against the upper portion of the lug, which is channeled as shown in Figure 2 to receive these lugs.

The frame is secured in place by tilting the forward end of the frame downward until the trough 20 enters beneath the lug on the motor and then the frame is slipped into place against the transmission case, being provided with gaskets of the usual type. The cover is now slipped on in the usual way and when the bolts are applied the cover presses against the open frame forming an oil-tight connection.

The pipe 19, as shown in the figures, leads directly through the frame 10 and therefore between the case and cover and is connected at its free end to an elbow 33 connected to a sight feed device of any preferred form, the device illustrated consisting of a float chamber 35 having a discharge orifice 36 leading to the return pipe 37 which discharges the overflow from the float chamber or reservoir 35 back into the transmission case. Within the chamber 35 is a float 38 carrying a head 39 adapted to rise into contact with a guard 40 when the reservoir is full. The guard is secured to the floor board to prevent injury to the head of the float and preferably consists of a single stamping having a central hole 41 slightly smaller in diameter than the silvered head of the float so that when the reservoir is filled the float rises carrying the head into position to close the opening 41 and exhibiting to the driver a shiny circle, while when the reservoir is empty or only slightly full the driver sees merely the black inside of the guard. The guard is secured to the floor board by screws or other fastenings 42. The exit opening 44 in the float chamber is usually somewhat constricted in order to keep the float chamber full when the automobile is in operation, this opening leading to a nipple 45 which is joined to the discharge tube 46 by means of an ordinary union 47.

The tube 46 leads to the front end of crank case 50 and extends to one side of the transmission case in order to be readily accessible for cleaning or repair. Connection between the tube 46 and the interior of the crank case may be had in any desired manner but my preferred form is to avoid any alteration of the parts of the standard automobile, and for this reason I provide the plate 51 which includes a central lug 52 bearing against the boss 54 and having at its extreme ends holes 55 of such size as to loosely receive the bolts 56 which fit into the tapped holes in the case 50.

At its forward end the plate 51 has an internal cylinder 58 supported above by the lateral stiffening ribs 59 and below by the longitudinal stiffening rib 60, this cylinder being perforated to form an entrance pipe and being threaded at its lower end 62 to receive an elbow 63 connected as by the union 64 with the tube 46 leading from the trough 20.

The method of attaching this plate is quite simple. The upper face 65 of the hollow cylinder 58 is provided with a gasket 66 of cork or other substance and this is brought into registry with the central bolt hole in the front of the crank case drip pan 68. The bolts 56 which have been inserted through the holes 55, and to which have been applied the nuts 70 to prevent loss of the bolts, and for an additional purpose presently to be described, are now screwed into the crank case 50 which binds the entrance pipe or hollow cylinder 58 against the case 50. This makes an efficient joint with the gasket 66 but alone would tend to cause leakage at the bolts 56. This is avoided, however, by the use of the nuts 70, which, after the device is in position, are screwed down on the bolts 56 and against the pan 68 in the usual manner thus preventing all leakage. If desired, a support 72 may be provided for a central portion of the tube 46 which may be attached to any of the bolts which secure the two cases together.

The operation of the device is as follows: The rapidly rotating fly wheel churns the oil discharging it at the top of the transmission case in a heavy stream. A portion of this discharged oil is strained through the wire gauze 27 and is caught in the trough 20, and flows by gravity through the pipe 19 through the sight feed to the tube 46 and then flows by gravity into the front end of the crank case where it drains successively into the pits or depressions 78 where it is splashed by the rotation of the crank. From these depressions the oil flows back to the transmission case in the usual manner.

What I claim is:

1. In a lubricating system for automobiles, a transmission case having a hand hole therein, an open frame secured to said case and surrounding said hand hole opening, a trough supported by said frame, a discharge pipe leading from said trough, and an imperforate cover closing the hole in said frame and the hand hole in said case.

2. In a lubricating system for automobiles, a transmission case, an open frame secured to said case, a lug extending inwardly from the inner edge of said frame, a trough supported by said lug, and a discharge pipe leading from said trough to a point outside of said transmission case.

3. In a lubricating system for automobiles, a transmission case, an oil receiving trough mounted therein and having a sloping bottom and a substantially vertical back forming an acute angle with said sloping bottom thereby to shed oil which may drip or flow down the outside of said sloping bottom to discharge same at such point, and a discharge pipe leading from said trough to a point outside of said transmission case.

4. In a lubricating system for automobiles, a transmission case having a sloping upper face and an opening in said sloping face, an open frame secured to said case and surrounding said opening, a lug extending toward the center of said open frame, a trough supported by said lug and extending forwardly of said open frame and beneath the margin of the opening in said transmission case, an extension on the lower rearward side of said open frame forming a support, a discharge pipe leading from said trough through said support, and a cover adapted to close the opening in said case and simultaneously to close the opening in said frame.

5. In a lubricating system for automobiles, a transmission case having an opening therein, an oil receiving trough supported within said case and to one side of said opening, a discharge pipe leading from said trough to a point outside of said case, and a sight feed connection secured to said discharge pipe at a point in proximity to said transmission case.

6. In a lubricating system for automobiles, a transmission case having an opening therein, an oil receiving trough supported within said case and to one side of said opening, a discharge pipe leading from said trough to a point outside of said case, a sight feed connection secured to said discharge pipe at a point in proximity to said transmission case, and means for returning oil to the transmission case from the sight feed connection through two passageways of different lengths.

7. In a lubricating system for automobiles, a transmission case having an opening therein, an oil receiving trough supported within said case and to one side of said opening, a discharge pipe leading from said trough to a point outside of said case, a sight feed connection secured to said discharge pipe at a point in proximity to said transmission case, and means for returning oil to the transmission case from the sight feed connection through two passageways of different lengths and capacities.

8. In a lubricating system for automobiles, a reservoir, a discharge pipe leading from the transmission case to said reservoir, means for discharging oil from said reservoir to the crank case, and means visible from the driver's seat for denoting the presence of oil in said reservoir.

9. In a lubricating system for automobiles, a transmission case, a reservoir, means for delivering oil from said case to said reservoir, means for delivering oil from said reservoir to the crank case, and means governed by the height of oil within said reservoir for indicating to the driver that oil is passing from the transmission case to the system.

10. In a lubricating system for automobiles, means for conveying oil from the transmission case to the crank case, and means for indicating to the driver that the system is in working order, said means including a member reciprocating at right angles to the floor board.

GIRARDUS G. NAUGLE.